United States Patent
Mawdsley et al.

(10) Patent No.: US 11,379,563 B2
(45) Date of Patent: Jul. 5, 2022

(54) METHOD AND APPARATUS FOR DATA OBFUSCATION

(71) Applicant: LOCKULAR LIMITED, Kendal (GB)

(72) Inventors: Gary Mawdsley, Manchester (GB); Dmitry Tishkovsky, Manchester (GB)

(73) Assignee: LOCKULAR LIMITED, Kendal (GB)

( * ) Notice: Subject to any disclaimer, the term of this patent is extended or adjusted under 35 U.S.C. 154(b) by 15 days.

(21) Appl. No.: 17/041,057

(22) PCT Filed: Mar. 26, 2019

(86) PCT No.: PCT/GB2019/050858
§ 371 (c)(1),
(2) Date: Sep. 24, 2020

(87) PCT Pub. No.: WO2019/186140
PCT Pub. Date: Oct. 3, 2019

(65) Prior Publication Data
US 2021/0097154 A1 Apr. 1, 2021

(30) Foreign Application Priority Data

Mar. 26, 2018 (GB) ........................... 1804818
Mar. 7, 2019 (GB) ........................... 1903063

(51) Int. Cl.
*G06F 21/14* (2013.01)
*G06F 21/32* (2013.01)
*G06F 21/62* (2013.01)

(52) U.S. Cl.
CPC ............. *G06F 21/14* (2013.01); *G06F 21/32* (2013.01); *G06F 21/6227* (2013.01); *G06F 2221/0748* (2013.01); *G06F 2221/0784* (2013.01)

(58) Field of Classification Search
CPC ...... G06F 21/14; G06F 21/32; G06F 21/6227; G06F 2221/0748; G06F 2221/0784
See application file for complete search history.

(56) References Cited

U.S. PATENT DOCUMENTS 6,687,824 B1 * 2/2004 Shin ..................... G06T 1/0021
348/408.1
7,391,865 B2 6/2008 Orsini et al.
(Continued)

FOREIGN PATENT DOCUMENTS

EP 3015988 A1 * 5/2016 .......... G06F 11/1458
EP 3015988 A1 5/2016
(Continued)

OTHER PUBLICATIONS

European Patent Office, International Search Report and Written Opinion for PCT/GB2019/050858, dated Jun. 4, 2019, 13 pages.

*Primary Examiner* — Hee K Song
(74) *Attorney, Agent, or Firm* — Barnes & Thornburg LLP

(57) ABSTRACT

There is provided a computer-implemented method of enhancing data privacy. One or more tensors of numeric data are determined, at a processor, in dependence on input data. A transform is determined in dependence on user-associated data, which may be user input or biometric data. Each of the one or more tensors of numeric data are transformed into at least two fragments of data by applying the transform. Each of the fragments of data obfuscates the numeric data. Each of the at least two fragments of data are stored separately at a respective geographically separated storage system.

18 Claims, 6 Drawing Sheets

(56) References Cited

U.S. PATENT DOCUMENTS

| | | | |
|---|---|---|---|
| 2012/0096562 A1* | 4/2012 | Desclaux | G06F 21/14 |
| | | | 726/26 |
| 2012/0166576 A1 | 6/2012 | Orsini et al. | |
| 2012/0185692 A1* | 7/2012 | Hamlin | H04L 63/0876 |
| | | | 713/155 |
| 2014/0112473 A1* | 4/2014 | Gassi | H04L 9/06 |
| | | | 380/255 |
| 2014/0237259 A1* | 8/2014 | Karabinis | H04B 7/1851 |
| | | | 713/189 |
| 2015/0304101 A1* | 10/2015 | Gupta | H04L 9/0866 |
| | | | 380/28 |
| 2016/0164682 A1* | 6/2016 | Hartloff | G06K 9/00073 |
| | | | 713/186 |

FOREIGN PATENT DOCUMENTS

| | | | | |
|---|---|---|---|---|
| JP | 2000101826 A | 4/2000 | | |
| WO | 2015057854 A1 | 4/2015 | | |
| WO | WO-2015057854 A1 * | 4/2015 | | G06F 17/16 |

\* cited by examiner

METHOD AND APPARATUS FOR DATA OBFUSCATION

CROSS-REFERENCE TO RELATED APPLICATIONS

This application is a U.S. national stage entry of PCT International Patent Application No. PCT/GB2019/050858, filed Mar. 26, 2019, which claims priority to Great Britain Patent Application No. 1804818.1, filed Mar. 26, 2018, and to Great Britain Patent Application No. 1903063.4, filed Mar. 7, 2019, the entire disclosures of which are incorporated herein by reference.

BACKGROUND

Increasing amounts of data is being stored. The stored data may relate to entities such as people and business. Particularly for such data privacy is a major concern. Regulations are also placing requirements on where data can be stored and in what form the data may be stored. Encryption is on one solution to data privacy. However, encryption may not be as strong as desired. It is therefore often desired to obfuscate data.

It is an object of embodiments of the invention to at least mitigate one or more of the problems of the prior art.

SUMMARY OF INVENTION

According to aspects of the present invention there is provided methods and apparatus as set forth in the appended claims.

According to one aspect of the invention there is a computer-implemented method of enhancing data privacy, comprising determining one or more tensors of numeric data, transforming each of the one or more tensors of numeric data into at least two obfuscated fragments of data, and storing, separately, each of the at least two fragments of data.

Optionally, the method further comprises retrieving the at least two fragments of data, and performing a reverse transform on the at least two fragments of data.

According to another aspect of the invention, there is a computer-implemented method of pre-processing data comprising receiving non-normalised input data, translating the input data to at least one numeric data set and a dictionary, and converting the at least one numeric data set to column oriented form. Advantageously, numeric tensors can be extracted from the column oriented form for use in the method of enhancing data privacy. Optionally, the input data is in a table format. In further embodiments the input data is a document or image. The input data may be received in the form of a stream. The stream optionally comprises a series of data values.

Optionally, the method of enhancing data privacy comprises encrypting input data or data based on the input data to produce the one or more tensors.

Optionally, the transforming comprises applying a wavelet transform to each of the one or more tensors of numeric data to generate the at least two fragments of data. In another embodiment the transforming comprises applying a linear transform to a part of the numeric data. The reverse transform may in this case be the inverse linear transform.

In a further embodiment of the invention, the transforming may comprise both a wavelet transform and a linear transform.

Prior to transforming, the method may comprise balancing at least some of the one or more tensors of numeric data.

Optionally, the storing, separately, each of the at least two fragments comprises storing a first fragment of data at a first computer system and a second fragment of data at a second computer system.

According to an embodiment of the invention there is provided computer software which, when executed by a computer, is arranged to perform any of the embodied methods. The computer software may optionally be stored on a computer-readable medium. The computer-readable medium may be non-transitory.

According to one aspect of the invention there is a computer-implemented method, comprising receiving input data, determining one or more tensors of numeric data in dependence on the input data, transforming each of the one or more tensors of numeric data into at least two obfuscated fragments of data, and storing, separately, each of the at least two fragments of data. The method may comprise processing the input data to form the one or more tensors of numeric data.

According to one aspect of the present invention there is provided a computer-implemented method of enhancing data privacy, comprising determining, at a processor, one or more tensors of numeric data in dependence on input data; determining, at a processor, a transform in dependence on user-associated data; transforming, at a processor, each of the one or more tensors of numeric data into at least two fragments of data by applying the transform, wherein each of the fragments of data obfuscates the numeric data; and storing, separately, each of the at least two fragments of data at a respective geographically separated storage system.

Advantageously, determining the transform in dependence on user-associated data allows each of a plurality of users to be associated with different data, and consequently a different transform. Each user being associated with a transform improves security and provides a decentralised system, wherein the user-associated data, and thus the user, is required to enable obfuscation and subsequent retrieval of data.

Optionally, the user-associated data comprises data indicative of an input received from a user via a user interface. Optionally, the user-associated data comprises biometric data associated with a user. For example, the biometric data may be indicative of one or more of: a fingerprint of the user, a heart rhythm of the user, an iris scan of the user, a facial structure of a user and DNA derived from the user.

According to one aspect of the present invention, there is provided a computing system, comprising one or more processors for operatively executing computer readable instructions; computer-readable data storage medium accessible to the one or more processors storing computer-readable instructions which, when executed by the one or more processors, perform a method comprising steps of: determining one or more tensors of numeric data in dependence on input data; determining a transform in dependence on user-associated data; transforming each of the one or more tensors of numeric data into at least two fragments of data by applying the transform, wherein each of the fragments of data obfuscates the numeric data; and storing, separately, each of the at least two fragments of data at a respective geographically separated storage system. In some embodiments, the computing system may comprise one computing apparatus. In other embodiments, the computing system may comprise two or more computing apparatuses, and the one or more processors may be distributed amongst the computing apparatuses. Advantageously, at least one of the computing apparatuses may be a user device such as a mobile phone. Thus, at least part of the computing system may be under physical user control. Obfuscation and subsequent reconstruction of the input data may then be decentralised, and data security improved.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
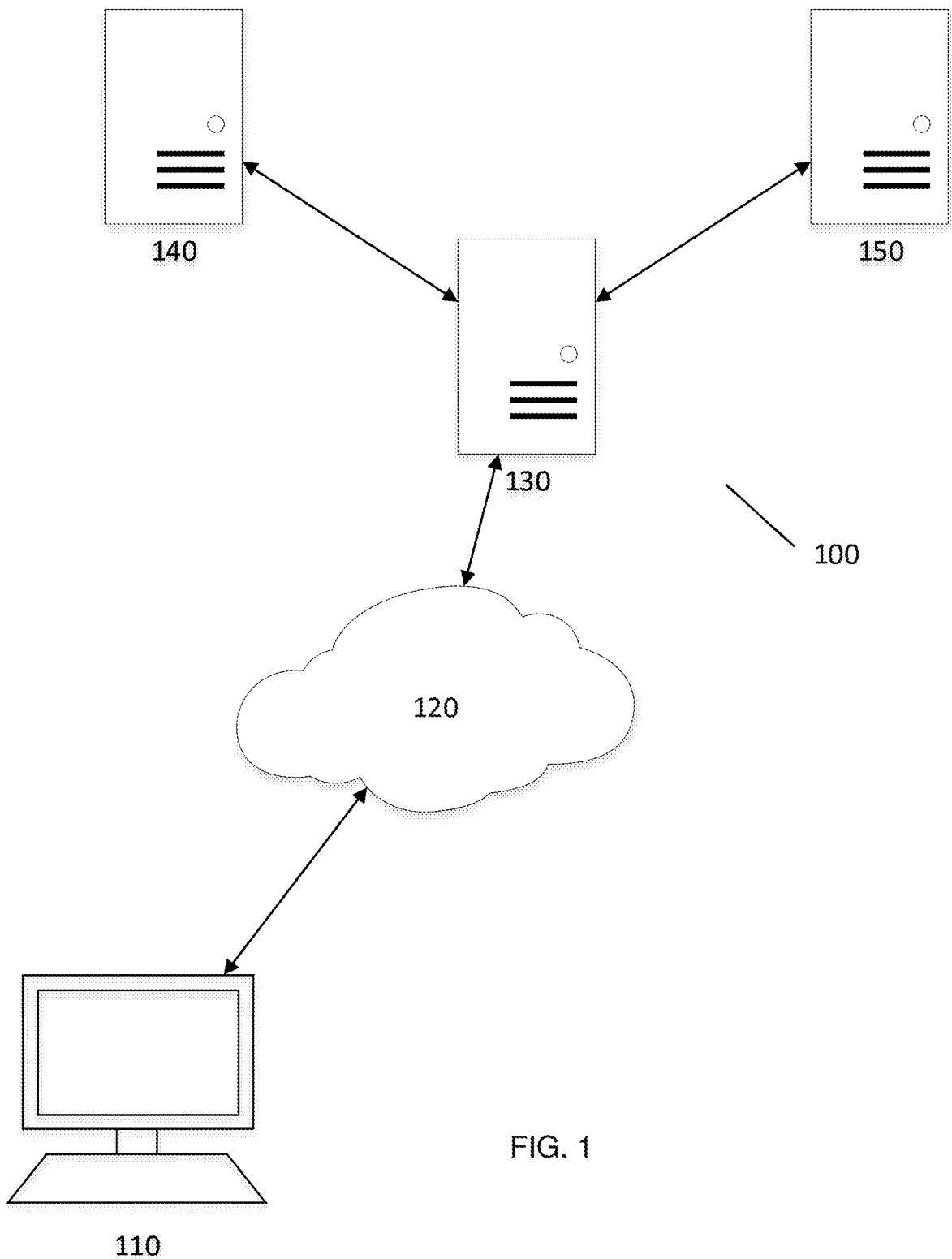
FIG. 1 shows a system according to an embodiment of the invention.

FIG. 1 illustrates a system, generally denoted as 100, according to an embodiment of the invention. The system 100 is a system for obfuscating data to enhance privacy of the data, as will be explained.

Figure 2:
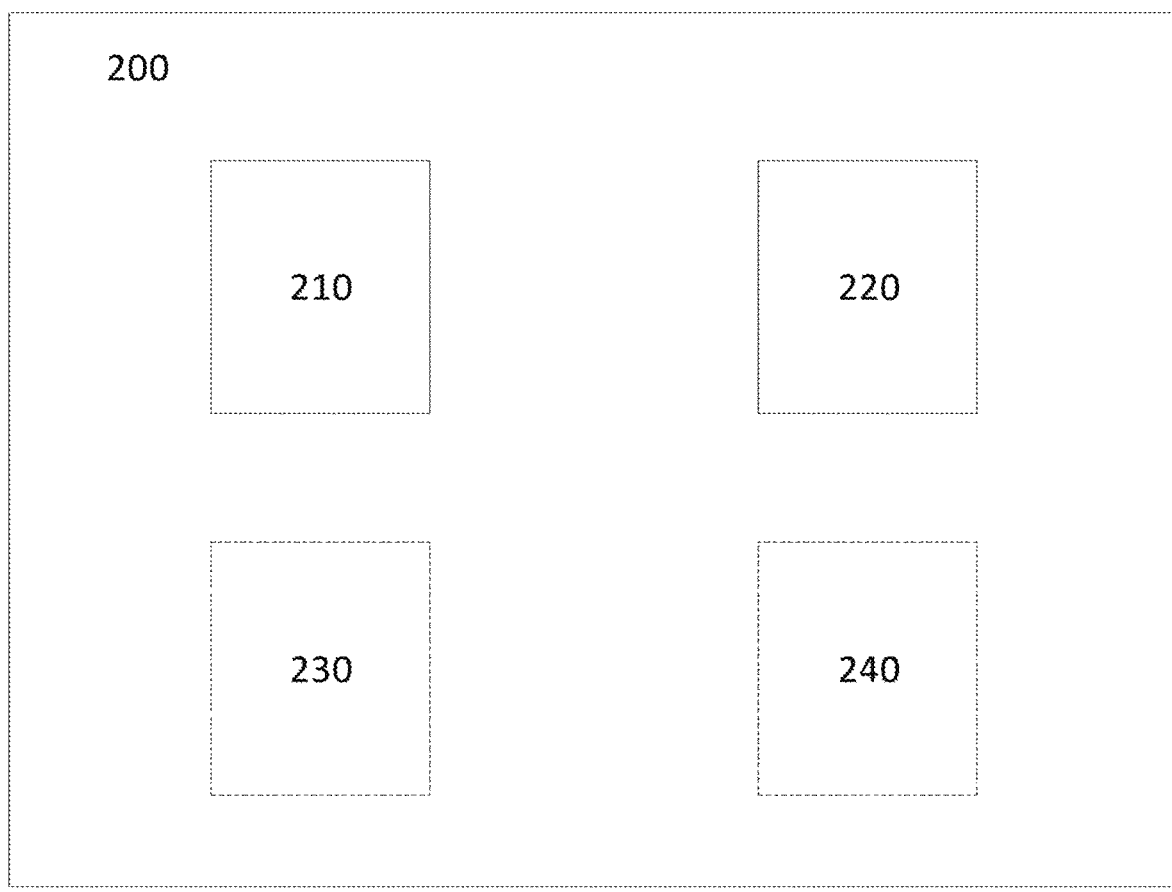
FIG. 2 shows a schematic illustration according to an embodiment of the invention.

The system 100 comprises a computer 130 on which a privacy engine 200 operatively executes. An embodiment of the privacy engine 200 is schematically illustrated in FIG. 2. The computer 130 may be a server computer 130, although in other embodiments the computer 130 may be a computer operated by a user. The computer 130 will hereinafter be referred to as a Privacy Engine Computer (PEC) 130.

In some embodiments, the PEC 130 is communicable with a client computer 110. The client computer 110 operably provides data to the PEC 130 which it is desired to store in a privacy-enhanced form. By computer it is understood that one or both of the client computer 110 or computer 130 may be a mobile computer such as a mobile computing device e.g. a telephone, tablet or laptop computer in some embodiments.

In some embodiments, elements of the privacy engine 200 may be distributed between the PEC 130 and the client computer 110. Implementing elements of the privacy engine 200 within the client computer 110 can be beneficial for data security, as securely stored data may then only be reconstructed on the client computer 110 when accessed by a user of the client computer 110. Securely stored data then does not need to exist in a constructed form on the client computer 110 or the PEC 130 when not being directly accessed. Advantageously storing and reconstructing data in this manner changes the nature of how secure data is treated, in addition to changing the relationship between the client computer 110 and the PEC 130 in comparison to conventional client relationships with a cloud-based data storage system. Fully reconstructed data is only resident when it is accessed by a user of the client computer 110, as will be explained further below, particularly with reference to method 400.

Each of the client computer 110 and PEC 130 may comprise one or more processors arranged to operably execute computer software thereon, where the computer software is stored in a computer-readable medium accessible to the one or more processors. The computer-readable medium may be one or more memory devices, where the memory may also store data for use by the software.

The client computer 110 and PEC 130 are communicably coupled by a computer network 120. The computer network 120 may comprise one or more networks such as Local Area Networks (LANs) and the Internet. The PEC 130 may provide an interface to receive data from the client computer 110. The data may be data which the client computer 110 wishes to store in the privacy-enhanced form as will be explained. The client computer 110 may execute a software application which is arranged to communicate with counterpart software executing on the PEC 130.

The system 100 further comprises a plurality of data storage systems. In the embodiments shown in FIG. 1 the system comprises first and second data storage systems 140, 150. One or both the of the first and second data storage systems 140, 150 may be geographically separated from the PEC 130. The PEC 130 and one or both of the first and second data storage systems 140, 150 may be communicably coupled over one or more networks such as the internet. The first and second data storage systems 140, 150 are separately operable to store data therein. Each of the data storage systems 140, 150 may comprise one or more data storage devices such as one or more of magnetic, optical or solid-state data storage devices. The PEC 130 is arranged to communicate data to each of the first and second data storage systems 140, 150 for storage therein. The data communicated to the first data storage system 140 by the PEC 130 is different to the data communicated to the second data storage system 150.

The first and second data storage systems 140, 150 may be located at separate geographic locations i.e. first and second data storage systems 140, 150 may be geographically separated. In particular, the first data storage system 140 may be located in a first territory and the second data storage system 140 located in a second territory. The first and second territories may have different rules or laws associated with the storage of data, particularly data relating to persons or entities, hereinafter personal data. Embodiments of the invention may allow data to be communicated from the PEC 130 to one or both of the first and second data storage systems 140, 150 without divulging or disclosing the personal data due to obfuscation of the data as will be explained. Whilst embodiments of the invention are described with reference to the first and second data storage systems 140, 150 for convenience, it will be appreciated that embodiments of the invention are not limited in this respect and that the system 100 may comprise more than two data storage systems 140, 150.

As noted above, FIG. 2 schematically illustrates the privacy engine 200. The privacy engine 200 may be distributed among one or more processors across the PEC 130 and the client computer 110. The privacy engine 200 has operatively executing thereon an obfuscation module 210 and a data storage module 220. In some embodiments, the privacy engine 200 has operatively executing thereon one or both of a pre-processing module 230 and an encryption module 240. The modules 210 to 240 may be distributed across the PEC 130 and the client computer 110. For example, in some embodiments, all the modules 210 to 240 operatively execute on the PEC 130. In other embodiments, one or more of the modules, for example the pre-processing module 230 and the obfuscation module 210, may at least in part operatively execute on the client computer 110.

The obfuscation module 210 is arranged to operatively transform first data into a plurality of fragments of data, wherein each of the fragments of data obfuscates the first data. By obfuscate it is meant that the first data cannot be obtained with certainty from a subset of the fragments of data. That is, both knowledge of the obfuscation process and possession of all of the fragments of data is necessary to re-obtain the first data with certainty that the correct first data has been re-obtained, as will be explained.

A fragment of data may be referred to as a frade, and the process of producing the fragments may be referred to as frading.

The data storage module 220 is arranged to receive, from the obfuscation module 210, the plurality of fragments of data and to determine which of the plurality of data storage systems 140, 150 will store each respective fragment of data. The data storage module 220 is arranged to distribute storage of the plurality of fragments of data amongst the plurality of data storage systems such that the plurality of fragments are not all stored on the same data storage system 140, 150. In some embodiments, each of the plurality of fragments of data are each stored on a respective one of the plurality of data storage systems 140, 150. For example, a first fragment of data is stored on the first data storage system 140 whilst a second fragment of data is stored on a second data storage system 150. Thus, in some embodiments, the data storage module 220 receives and distributes storage of the fragments of data amongst the plurality of data storage systems 140, 150.

As noted above, in some embodiments the system comprises one or both of the pre-processing module 230 and the encryption module 240. The pre-processing module 230 is arranged to perform one or more operations on data prior to the data being provided to the obfuscation module 210. In particular, the pre-processing module 230 may convert data into a format suitable for being operated on by the obfuscation module 210. The encryption module 240 may encrypt the data prior to the data being provided to the obfuscation module 210. The encryption may be performed according to a predetermined encryption algorithm or one of a plurality of encryption algorithms selected by a user.

Figure 3:
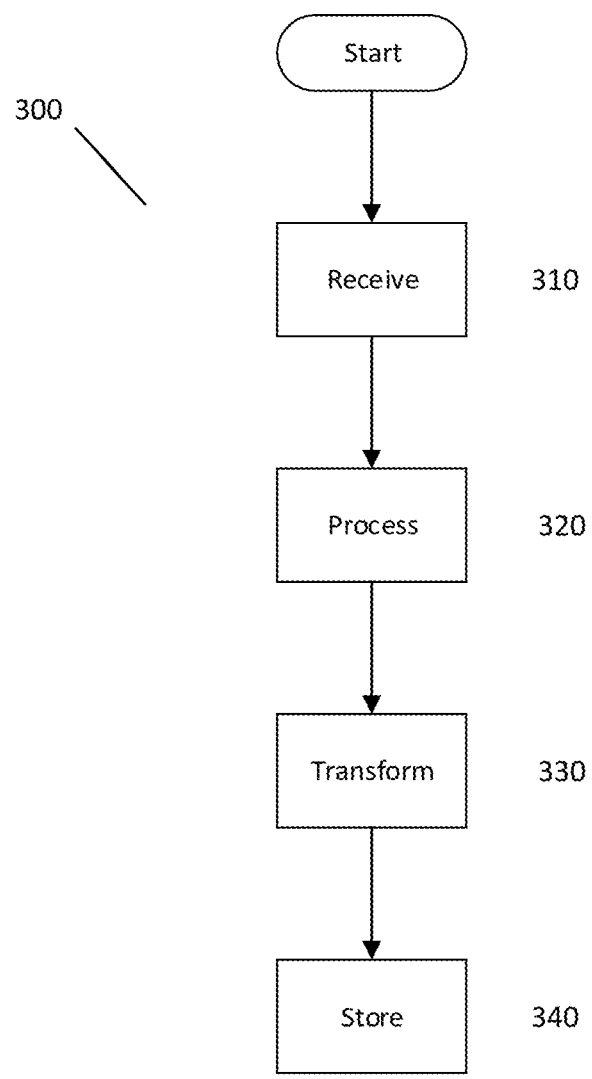
FIG. 3 shows a method according to an embodiment of the invention.

FIG. 3 illustrates a method 300 according to an embodiment of the invention. The method 300 is a computer-implemented method of enhancing data privacy. The method 300 may be performed by the PEC 130, or a combination of the PEC 130 and the client computer 110. In some embodiments, at least some of steps forming the method 300 may be performed by the obfuscation module 210 and the data storage module 220.

The method 300 comprises a step 310 of receiving data. The data may be received at the privacy engine 200 from the client computer 110. In some embodiments the data may be a file representative of, for example, an image, video data, a document such as a Microsoft Word(®) or PDF file (although embodiments are not limited to the type of document). In other embodiments the data may be at least a portion of structured data for storing a data set. For example, the data may be at least a portion of a relational data set as will be explained below particularly with reference to further explanation of the pre-processing module 230. For ease of understanding, an embodiment of the invention will be explained where the data received in step 310 is numeric data with it being understood that embodiments of the invention are not limited in this respect. For example, the data may be alphanumeric data. In the illustrated embodiment the received numeric data comprises a series of numeric values.

The method 300 in some embodiments comprises a step 320 of processing the data received in step 310. As noted above, in the illustrated embodiment step 310 comprises receiving a series of numeric values. In step 320 the received numeric values may be processed to form one or more tensors of numeric data e.g. as a vector. The tensor comprises N numeric values where N is an integer greater than one. Thus step 320 may comprise dividing or allocating the received data amongst a plurality of tensors.

An example tensor where N=3 determined in step 310 is:
[1517270400 784 785]

It will be understood that the numeric values are merely an example.

Step 320 may also optionally comprise pre-encrypting the data set by the encryption module 240, according to an encryption algorithm. The encryption algorithm used may be an encryption algorithm known to the skilled person, for example 256-bit AES encryption, although other encryption algorithms and techniques may be used. It is appreciated that this pre-encryption can be performed on the resultant tensors, or on the original data received in step 310 prior to the other operations performed in step 320.

Further operations performed in step 320 may be undertaken particularly by one or both of the pre-processing module 230 and the encryption module 240 and thus the one or more operations performed in step 320 may be omitted in some embodiments.

The method 300 comprises a step 330 of transforming the data to form a plurality of fragments of data.

In some embodiments, an initial part of step 330 may comprise determining or selecting an appropriate obfuscation process. The determination of the obfuscation process may comprise receiving an indication from the client computer 110 selecting one of a plurality of obfuscation processes supported by the PEC 130. The determination of the obfuscation process may comprise determining a transform to be used in transforming the data, as will be explained. In example embodiments a first obfuscation process is a wavelet-based obfuscation process utilizing a wavelet transform and a second obfuscation process is based on alternative transform data, as will be explained. The indication may provide a selection of one of the first and second obfuscation processes. In other embodiments, the obfuscation process may be provided to the PEC 130, such as from the client computer 110. The obfuscation process may be provided in the form of a set of instructions for carrying out the obfuscation process i.e. to form an algorithm by which the obfuscation is carried out. The obfuscation process may be provided in the form of bytecode communicated to the privacy engine 200. In some embodiments a wavelet is communicated from the client computer 110 to the privacy engine 200. In other embodiments, data for use in the obfuscation process, such as the transform data, is communicated from the client computer 110 to the privacy engine 200.

According to some embodiments of the present invention, a transform for use in step 330 may be determined in dependence on user-associated data. In this way, each of a plurality of users may be associated with different user-associated data, and consequently, a different transform.

Figure 6:
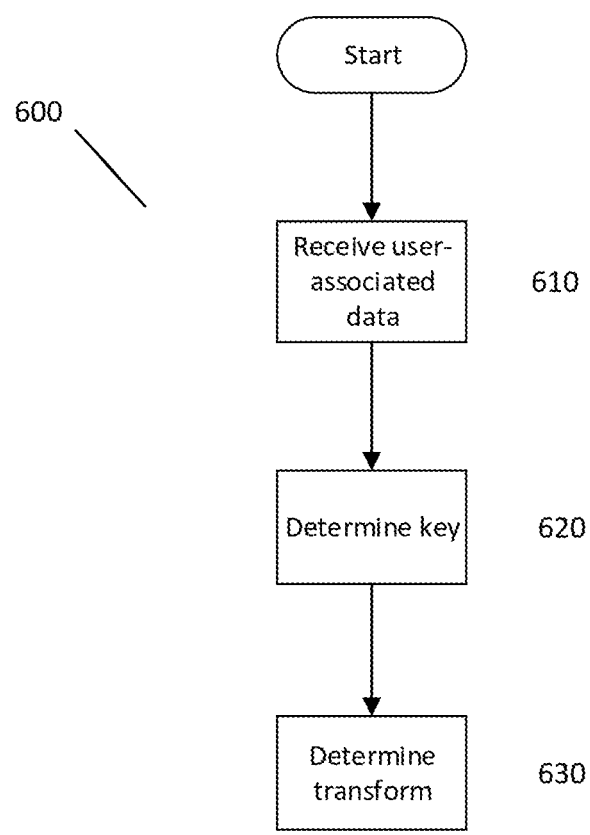
FIG. 6 shows a method of determining a transform according to an embodiment of the invention.

A method 600 for determining the transform in dependence on user-associated data is illustrated in FIG. 6. The method 600 may be performed as part of step 330 on the privacy engine 200. In other embodiments, the method 600 may be performed independently of method 300. For example, the method 600 may be performed prior to the method 300.

The method 600 comprises a step 610 of receiving or retrieving user-associated data to be used for determining the transform. The user-associated data may either be received from a user during step 610 or may have been determined previously and stored, for example on client computer 110. The user associated data may comprise one or both of biometric data associated with a user, or data indicative of an input received from a user, i.e. user input data.

For example, the user input data may comprise data indicative of an input received from a user via a user interface. The user interface may receive an indication of a physical, audible or gesture input from the user. The user input data may then comprise data indicative of the received physical, audible or gesture input. In some embodiments, the user input data may comprise data indicative of a passphrase, i.e. alphanumeric string, provided verbally or via touch input from the user.

Additionally or alternatively to input received from a user, the user-associated data may comprise biometric data associated with a user. For example, the biometric data may be indicative of one or more biometric measurements of a user. Biometric measurements utilised in embodiments of the present invention may include: a measurement of a fingerprint of the user, for example received from a fingerprint scanner; a measurement of a heart rhythm of the user for example from an ECG; a measurement taken from an iris scan or a retinal scan of the user, a measurement of facial structure of the user from a facial recognition system, or a measurement obtained from a DNA sequencing system utilising user DNA. Step 610 may comprise receiving the one or more biometric measurements from the user, for example by communicating with one or more biometric measurement systems, such as the fingerprint scanner, facial recognition system, ECG system or DNA sequencing system. Alternatively, the biometric measurement may have been taken independently of method 600 and stored in a memory, and step 620 may then comprise retrieving the biometric data from the memory. It will be appreciated that the biometric measurements and biometric measurement systems are not limited to this list, and any biometric measurement related to a measurable human characteristic may be used to derive the biometric data.

Method 600 may comprise a step 620 of determining a user key K from the user-associated data. The user key K is uniquely associated with the user, and may be used to generate transforms for obfuscation and retrieval of data, as will be explained.

In an illustrated example of step 620, the user key K is generated from biometric data associated with the user, although it will be appreciated that in some embodiments step 620 may comprise generating the user key K from user input data such as a string indicative of a passcode.

As discussed, the biometric data received in step 610 may be associated with one or more biometric measurements. Each biometric measurement can be represented as one or more samples of a feature vector $X=(x_1, \ldots, x_N)$. The feature vector X comprises a plurality of features $x_i$, which may each be an extracted parameter or principal component of the biometric measurement. For example, if the biometric measurement is an ECG measurement the biometric data may comprise a plurality of features associated with the ECG measurement. In some embodiments the features $x_i$ comprise extracted parameters such as RQ-amplitude, QS-duration, RS-amplitude, ST-amplitude, QT-duration or any other known parameter of the ECG data. It will be appreciated that other features may also be extracted. Analogously, known features may be extracted from other biometric measurements such as a fingerprint scan, DNA sequencing, facial recognition etc. The skilled user will appreciate that for any biometric measurement a variety of parameters may be selected as features $x_i$, for example one or more principal components derived from a training set.

In some embodiments, step 620 may comprise serialising the feature vector X into an array of bytes to determine the user key K. The user key K may be determined analogously in step 620 in embodiments where other user-associated data is used. For example, if the user-associated data is a string indicative of a passcode, step 620 may comprise serialising the string into an array of bytes to determine the user key K.

It may be desired to determine the user key K such that utilizing two biometric measurements from the same individual taken at different time points will each result in determining the same user key K with a sufficiently high probability, i.e. to produce a stable biometric user key K. A stable biometric user key K may be generated from a plurality of samples of each feature $x_i$ of the biometric measurement. In some embodiments of the present invention, step 620 comprises providing such a stable biometric user key K, as follows.

For a given biometric measurement, predetermined population data may be accessible by the privacy engine 200 during step 620. The predetermined population data may comprise information indicative of the distribution of each feature i over a predetermined population, for example by indicating one or more generalised attributes such as a mean $\mu_i^g$ and a standard deviation $\sigma_i^g$ estimate of each feature i over the predetermined population. In some embodiments, the predetermined population data may comprise a large enough number of training samples of each feature i such that the distribution of each feature i over the population may be derived with a reasonable degree of accuracy. Step 620 may then comprise determining a mean $\mu_i^g$ and a standard deviation $\sigma_i^g$ estimate of each feature i over the predetermined population data.

Each biometric measurement received in step 610 may comprise M samples of the feature vector X. Step 620 may then comprise deriving a mean $\mu_i$ and a standard deviation a, estimate of each feature i for the M samples received from the user. For example an ECG measurement may comprise a plurality, such as 5, heartbeats (M=5) from which each of the features i outlined above may be extracted.

Step 620 may comprise defining, for each feature i, a parameter $k_i^g$ indicative of an interval of values such that the probability of any measurement of the feature i within the population to fall outside the interval is sufficiently small. For example, each $k_i^g$ may be defined such that the probability of any measurement of the feature i within the population to fall outside the interval $(\mu_i^g - k_i^g \sigma_i^g, \mu_i^g + k_i^g \sigma_i^g)$ is lower than a predetermined threshold. For example, if the distribution of the feature i over the population is close to normal, the parameters $k_i^g$ may be set at 4 or 5, although it will be appreciated that other values can be assigned.

Step 620 may comprise defining, for each feature i, a parameter $k_i$ indicative of the distinguishability of each feature i for the M samples received from the user. Each $k_i$ may be selected and adjusted for the user in advance. In some embodiments, each $k_i$ is selected such that an appropriate function F(k) is maximised, wherein F(k) increases with entropy for generated user keys K and decreases with the number of false negative outcomes on the feature i.

Step 620 may then comprise determining the user key K in dependence on the parameters $k_i$, $k_i^g$, $\mu_i^g$, $\sigma_i^g$, $\mu_i$, and $\nu_i$. That is, step 620 may comprise determining the user key K in dependence on the distribution of each feature i for the user's biometric data in comparison to the population distribution of each feature i. Advantageously, determining the user key K in dependence on these parameters allows generation of the same user key K from two biometric measurements from the same user with sufficiently high probability. This advantageously allows decentralisation of data access and improved data security.

For example, in one embodiment of the invention, the user key K is defined as a bit string:

$$K = c_1 d_1 c_2 d_2 \ldots c_{N'},$$

$$c_i = \begin{cases} {}^{2n_i}(n_i + j), & \mu_i - j \cdot (k_i \sigma_i) > \mu_i^g, j = 1, \ldots, n_i; \\ {}^{2n_i}(n_i - j + 1), & \mu_i - j \cdot (k_i \sigma_i) < \mu_i^g, j = 1, \ldots, n_i; \\ \text{empty}, & \text{otherwise} \end{cases}$$

$$n_i = \left\lceil \frac{k_i^g \sigma_i^g}{2(k_i \sigma_i)} \right\rceil$$

$$d_i(i = 1, 2, \ldots, N-1) = {}^{2n_i}(2^{l(2n_i)-1})$$

Wherein for an integer a, l(a) is defined as:

$$l(a) = \lceil \log_2(a+1) \rceil + 1$$

And for integers a and b, $^b a$ denotes the number a written as a bit string of length l(b) bits representing a in binary.

It will be appreciated that the above illustrates only one possible user key K according to embodiments of the present invention, and alternate keys utilising the parameters $k_i$, $k_i^g$, $\mu_i^g$, $\sigma_i^g$, $\mu_i$, and $\sigma_i$ can also be envisaged.

Method 600 comprises a step 630 of determining the transform in dependence on the user key K. The determined transform may be utilised within the method 300 to transform the data in step 330.

Advantageously utilising a transform determined by method 600 to transform the data improves security of the data transformed and stored according to method 300. As the transform determined by method 600 is based on user-associated data, the user-associated data is required to determine either the transform or the corresponding reverse transform required to reconstruct the data according to a method 400. The user-associated data does not need to be stored within the system 100, and can be produced by the user each time the user desires to store or access data according to method 300 or 400. For example, the user input or biometric measurement may be provided by the user each time the data is accessed or stored, ensuring the data cannot be reconstructed without the user providing said data. Such embodiments of the present invention provide a decentralised aspect to data, thus improving security and user agency.

Step 630 will be described in conjunction with step 330 with reference to illustrated embodiments, wherein the determined transform may be a wavelet transform, or a linear transform. In embodiments wherein the determined transform is a wavelet transform, the tensor of numeric data is transformed into the plurality of fragments which obfuscate the numeric data by application of a Wavelet to the tensor. In embodiments wherein the determined transform is a linear transform, the tensor of numeric data is transformed into the plurality of fragments obfuscating the numeric data by a linear transformation.

Referring first to the embodiments comprising application of the wavelet to the tensor, a mother wavelet, i.e. a wavelet transform, is selected. Step 630 may comprise determining the mother wavelet in dependence on the user key K. For example, the user key K may be used to generate a function f(x) to be used as the mother wavelet.

In certain embodiments the mother wavelet is a discretely sampled wavelet, though continuous wavelets may also be envisaged. It will be understood that a wavelet is any small wave which in itself does not repeat. Application of the wavelet to the tensor comprises fitting the wavelet to the tensor. The amplitude and frequency of a sampled part of the wavelet are adjusted such that the resultant part of the wavelet is a good fit to a part of the tensor, and the adjustments to the frequency and amplitude are stored. Advantageously, the original tensor can be reconstructed from the mother wavelet and the adjustments to the frequency and amplitude.

In an illustrated embodiment the mother wavelet is described as a Haar wavelet with it being appreciated that embodiments are not limited in this respect. For instance, the mother wavelet may be a Daubechies wavelet, a Symlet wavelet, a Coiflet wavelet or a Shannon wavelet in other embodiments. This is a non-exhaustive list of possible mother wavelets, as will be appreciated.

For some wavelets an input tensor is required to be a certain length. For example, the input tensor may be required to be even (comprise an even number of values) i.e. for N to be an even value i.e. 2, 4, 6 etc. Thus step 330 may comprise balancing at least some of the one or more tensors of numeric data prior to performing the transforming. Balancing is understood to mean padding the tensor of numeric data to comprise a larger number of values. For example, balancing may comprise padding N from an odd value to an even value. For example, the example tensor above is balanced to:

[1517270400 784 785 0]

The balancing may be performed by inserting a numeric value into the tensor. The inserted numeric value may be zero, as illustrated above, although other values may be inserted.

In some embodiments, the wavelet processing comprises at least one level. In an illustrated example, the wavelet comprises five levels although it will be appreciated that other numbers of levels may be used. Applying the wavelet to the tensor, as above, yields two sets of values, a first set of wavelet coefficients and a second set of ordering values. The sets of values form the fragments of data. A first fragment comprises the plurality of wavelet coefficients. A second fragment comprises the plurality of ordering values. Example fragments are shown below where the values as scaled for convenience, in this case by 1.0E+9. The fragments below are of equal length, however the invention is not limited in this respect and the length of each fragment will depend on the mother wavelet chosen.

Fragment1=[2.1457 0 0 0 07586 1.0729 0.0000]
Fragment2=[1 1 1 1 1 2 4]

As shown above, neither fragment contains directly data from the original tensor. Thus the fragments each obfuscate the original tensor data.

In a further illustrative embodiment of the invention the original tensor comprises 8 values:

Original=[2,2,0,2,3,5,4,4]

The mother wavelet is a Haar wavelet. At each level of the at least one level, the wavelet processing comprises computing an array of pairwise averages of the original tensor:

Averages1=[2,1,4,4]

The wavelet processing further comprises, at each of the at least one level, storing detail coefficients. The detail coefficients may, for example, be the differences of the second of each pair from the pairwise average:

Detail1=[0, −1,−1,0]

The process is repeated on the array of pairwise averages at each subsequent level of the plurality of levels. For example, if the process is repeated for the maximum number of levels for this tensor:

Averages2=[3/2, 4]
Detail2=[1/2,0]
Averages3=[5/4]
Detail3=[−5/4]

Averages3 may be used as the first fragment, and a vector comprising the Detail coefficients may be used as the second fragment.

In other embodiments, the wavelet processing comprises a plurality of scaling linear transformations. The scaling linear transformations are applied to portions of the wavelet curve, in order to fit it to the tensor. The scale of each linear transformation will match the amplitude of the curve. The fragments will then comprise information indicative of the scaling linear transformations performed.

In other embodiments of the invention, step 330 comprises transforming the tensor into a plurality of fragments which obfuscate the original tensor data by a linear transformation.

In these embodiments, step 630 may comprise determining a linear transform in dependence on the user key K. The linear transform may representable as an invertible M×M matrix. In some embodiments the user key K may be utilised to determine the M×M matrix unambiguously, i.e. such that utilising the same user key K always results in the same M×M matrix. This can be achieved in a variety of ways as will be appreciated by the skilled person, and embodiments of the present invention are not limited to any particular technique.

As one example, the user key K may be utilised to generate a hash H of bytes of a fixed length, and H may be used as an initialisation parameter for a pseudo-random number generator G which may be used to generate an M×M matrix. As a second example, the user key K may be used in a hashing algorithm to produce a hash H of length 8M×8M, and the hash H may then be rewritten as an M×M matrix of 8-byte numbers. Any hashing algorithm may be used to generate the hash H.

The linear transform may then be used to transform the data in step 330. In an illustrated example, the tensor of numeric data is a rank 1 tensor. As described above, the tensor may be balanced. The tensor may be balanced such that N is divisible by the number of desired fragments. For example, if two fragments are desired, the tensor is balanced to an even length, and if three fragments are desired, the tensor is balanced to a length divisible by three. Different numbers of desired fragments, and thus balancing N to alternate values, can also be envisaged. In the present example, the tensor is balanced such that N=4:

[1517270400 784 785 0]

The value of N may be selected to be divisible by a number of fragments without remainder. In the described embodiment the number of desired resultant fragments is two although other numbers of fragments may be chosen.

Step 330 comprises dividing the tensor into a plurality of parts. The length of the parts is selected in dependence on how many resultant fragments are desired from the transformation. For example, if two resultant fragments are desired, the tensor is split into first and second parts, each of length two:

Part1=[1517270400 784]
Part2=[785 0]

It is appreciated that the tensor is not restricted to being divided into two parts, but rather the tensor may be split into more than two parts, with the parts all having equal dimension. Each part of the tensor may have the same number of values as there are desired fragments. In the illustrated embodiment, two fragments are desired, and so each part of the tensor has length 2.

Embodiments of the invention utilise transform data. The transform data is an invertible tensor transformation which can be numerically represented. For example, the transform data may be an invertible M×M rank 2 tensor, with matrix rank M. In some embodiments, the transform data is determined from the user key K in step 630, as has been explained. In some embodiments, M is chosen to be equal to the number of desired fragments, which is also the length of the data parts. For example, in the above case the transform data is selected to be an invertible 2×2 rank 2 tensor:

$$\text{Transform} = \begin{bmatrix} 5 & 2 \\ 2 & 1 \end{bmatrix}$$

It is appreciated that any other invertible 2×2 rank 2 tensor may alternatively be chosen or determined as the transform data, for example by performing method 600.

The first part of the tensor (Part1) is transformed into a first transformed tensor in dependence on the transform data.

The transformation of the first part of the tensor into a first transformed tensor may be achieved by applying an operation on the part of the tensor and the transform data. For example, the operation may comprise multiplying the transform data by the first part of the tensor. It is appreciated that other operations aside from multiplication may be used. In the case of multiplication, transforming the first part of the tensor above in dependence on the transform data yields:

$$\begin{bmatrix} 5 & 2 \\ 2 & 1 \end{bmatrix} * [\,1517270400 \quad 784\,] = [\,7586353568 \quad 3034541584\,] = \textit{Trans}1$$

The second part of the tensor is transformed into a second transformed tensor in dependence on the transform data. As with the first part of the tensor, the transform may comprise multiplying the second part of the tensor by the transform data. In the illustrated example, the transformation of the second part of the tensor yields:

$$\begin{bmatrix} 5 & 2 \\ 2 & 1 \end{bmatrix} * [\,785 \quad 0\,] = [\,3925 \quad 1570\,] = \textit{Trans}2$$

The transformed tensors from the illustrated example are shown below.

Trans1=[7586353568 3034541584]
Trans2=[3925 1570]

The fragments of data are constructed in dependence on the two transformed tensors. In some embodiments, the first fragment of data is constructed by creating a vector from the first entry in each transformed tensor. The second fragment of data may be constructed by creating a vector from the second entry in each transformed tensor. In further embodiments, each further fragment of data may be constructed in an analogous way, by constructing a vector from a further entry of each transformed tensor. For example, two fragments of data can be formed from the two transformed tensors:

Fragment1=[7586353568 3925]
Fragment2=[3034541584 1570]

As shown above, neither fragment contains directly data from the original tensor. Thus, the fragments each obfuscate the original tensor data.

In alternate embodiments wherein the input data has been divided into more than two parts, each further part of the tensor may be transformed in dependence on the transform data to yield a further fragment.

It is appreciated that the transform data may be other dimensions than a 2×2 rank 2 tensor. For example, the transform data may be a 3×3 or 4×4 rank 2 tensor, although embodiments are not limited in this respect.

In some embodiments of the invention the method 300 comprises a step 340 of storing the obfuscated data. The obfuscated data is the output of transforming step 330, and may comprise two or more fragments. In some embodiments, step 340 is performed by the data storage module 220. Data storage module 220 receives the two or more fragments, such as from the obfuscation module, as created in step 330. Step 340 comprises distributing the fragments amongst a plurality of data storage systems, for example data storage systems 140 and 150, such that all fragments of data are not stored on the same data storage system. In some embodiments the plurality of fragment are distributed each to a respective data storage system 140, 150. The first fragment (Fragment1) may be provided to the first data storage system 140 for storage therein and the second fragment (Fragment2) may be provided to the second data storage system 150 for storage therein.

In some embodiments, step 340 also comprises storing spurious, or fake, fragments of data as well as the obfuscated data. A spurious fragment is understood to be a fragment not derived from the original data, but created to mimic the characteristics of a real fragment. Spurious fragments may be used to improve obfuscation of the original data.

In some embodiments, a spurious fragment may be stored for every real fragment stored, although different numbers of spurious fragments may also be envisaged. Each spurious fragment may be generated with equal dimension and order of magnitude to a real fragment. The spurious fragments may be entirely or in part generated by, for example, random or pseudo-random number generation. The spurious fragments may be generated at the data storage module 220.

Each spurious fragment may be stored in the same data storage system as a real fragment, or may be stored in a separate data storage system. For instance, 2 spurious fragments (Spurious1 and Spurious2) may be generated. The first data fragment and first spurious fragment (Fragment1 and Spurious1) may be provided to the first data storage system 140 for storage therein. The second data fragment and second spurious fragment (Fragment2 and Spurious2) may be provided to the second data storage system 150 for storage therein. In another embodiment a third data storage system (not shown) may store one or more spurious fragments alone i.e. without a data fragment also being stored on the same data storage system.

In some embodiments, step 340 also comprises a step of storing metadata. The metadata may comprise a schema for each input data set, which contains information about the input data. For instance, the schema may define the columns and data types of an input relational database. The metadata may further contain information about the locations of the real and spurious data fragments i.e. which data storage system stores the fragments. Step 340 may comprise a step of obfuscating the metadata before it is stored. The step of obfuscating the metadata may comprise any of the methods so far discussed, or the metadata may be obfuscated in an alternate way.

Figure 4:
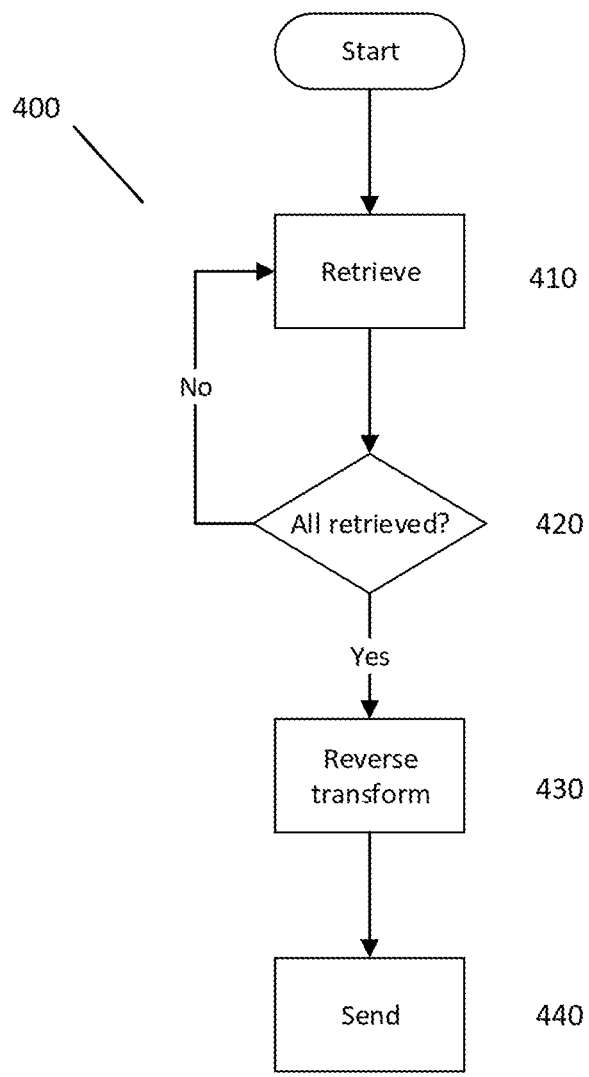
FIG. 4 shows a method according to an embodiment of the invention.

FIG. 4 illustrates a method 400 according to an embodiment of the invention. The method 400 is a computer-implemented method of reconstructing data from obfuscated fragments of data. By reconstructing it is meant that a plurality of fragments of data are used in a reverse obfuscation process to obtain an original tensor of numeric data. The method 400 may be performed, in some embodiments, by the PEC 130 or in other embodiments by the client computer 110. In some embodiments, at least some of steps forming the method 400 may be performed by the obfuscation module 210 and the data storage module 220 as will be appreciated.

The method 400 comprises a step 410 of retrieving obfuscated data. The obfuscated data comprises a plurality of fragments created by method 300. As described above in connection with FIG. 3, the plurality of fragments are distributed amongst the plurality of data storage systems, for example data storage system 140 and data storage system 150. Each fragment of data is retrieved from the respective data storage system 140, 150 at step 410. The metadata may also be retrieved at step 410, or the metadata may already be accessible by the PEC 130 or client computer 110.

In step 420 it is determined whether all of the fragments corresponding to an original tensor of data have been retrieved. If not, the method returns to step 410 wherein a further fragment of data is retrieved before another check is performed in a further iteration of step 420. Once it is determined in step 420 that all fragments have been retrieved the method moves to step 430. Determining that all fragments have been retrieved may comprise checking the retrieved fragments against information contained in the metadata.

The method 400 further comprises a step 430 of performing a reverse transform on at least one of the fragments of data.

An initial part of step 430 may, in some embodiments, comprise selecting an appropriate reverse obfuscation process, in particular selecting an appropriate reverse transform operation. Where the obfuscation process used to generate the fragments of data comprised application of a wavelet to a numeric tensor at step 330, a consistent reverse obfuscation process is selected. Alternatively where the obfuscation process used to generate the fragments of data comprised application of a linear transformation to a numeric tensor at step 330 a consistent reverse obfuscation process is selected.

In the case of the data fragments being created by the application of Wavelet transform, the reverse transform step 430 comprises applying an inverse Wavelet transform. The inverse Wavelet transform is dependent on the wavelet used in step 330, which may for example be a Haar wavelet, although as will be appreciated, other wavelets may be used. The inverse wavelet transform is defined to reverse the process of the wavelet transform used in step 330.

In the case of the data fragment being created by the application of a linear transformation, step 430 comprises reconstructing the transformed tensors from the fragments of data and performing the reverse transform on the transformed tensors in dependence on reverse transform data.

Fragment1=[7586353568 3925]
Fragment2=[3034541584 1570]

The transformed tensors may be reconstructed from the data fragments by reversing the construction of the data fragments performed in step 330. This may comprise reconstructing a first transformed tensor from the first element of each data fragment, and reconstructing a second transformed tensor from the second element of each data fragment. This produces the transformed tensors:

Trans1=[7586353568 3034541584]

Trans2=[3925 1570]

In some embodiments, the reverse transform data is defined in dependence on the transform data used in step 330. According to an illustrated embodiment, the transform data is an invertible 2×2 rank 2 tensor. The reverse transform data may be determined by computing the matrix inverse of the transform data, which for the illustrated example yields the rank 2 tensor below.

$$\text{Reverse transform data} = \begin{bmatrix} 1 & -2 \\ -2 & 5 \end{bmatrix}$$

In embodiments where step 330 comprised multiplying a tensor part by transform data to obtain a transformed tensor, then the reverse transform comprises multiplying the reverse transform data by the transformed tensor. This operation retrieves the data part from which the data fragment was transformed. In the illustrated example, step 420 comprises multiplying the reverse transform data by the transformed tensor, as illustrated below.

$$\begin{bmatrix} 1 & -2 \\ -2 & 5 \end{bmatrix} * [\,7586353568 \quad 3034541584\,] = [\,1517270400 \quad 784\,] = Part1$$

In this example the reverse transform is applied to one transformed tensor, although it is appreciated that step 420 may comprise applying a reverse transform to a plurality of transformed tensors. That is, the reverse transform is applied to each of the transformed tensors.

Advantageously, if one or more modules of the privacy engine 200 are incorporated into the client computer 110, step 420 may be performed locally on the client computer 110 only when a user requires access to the original data fragments. In this way the reconstructed data may only exist at a time at which it is accessed by a user of the client computer 110, and so the reconstructed data will not exist outside the client computer 110, for example on PEC 130. In these embodiments, the reconstructed data will only exist at a time at which a user of the client computer 110 is directly accessing it. Thus, the nature of cloud-based data access is made significantly more secure.

Figure 5:
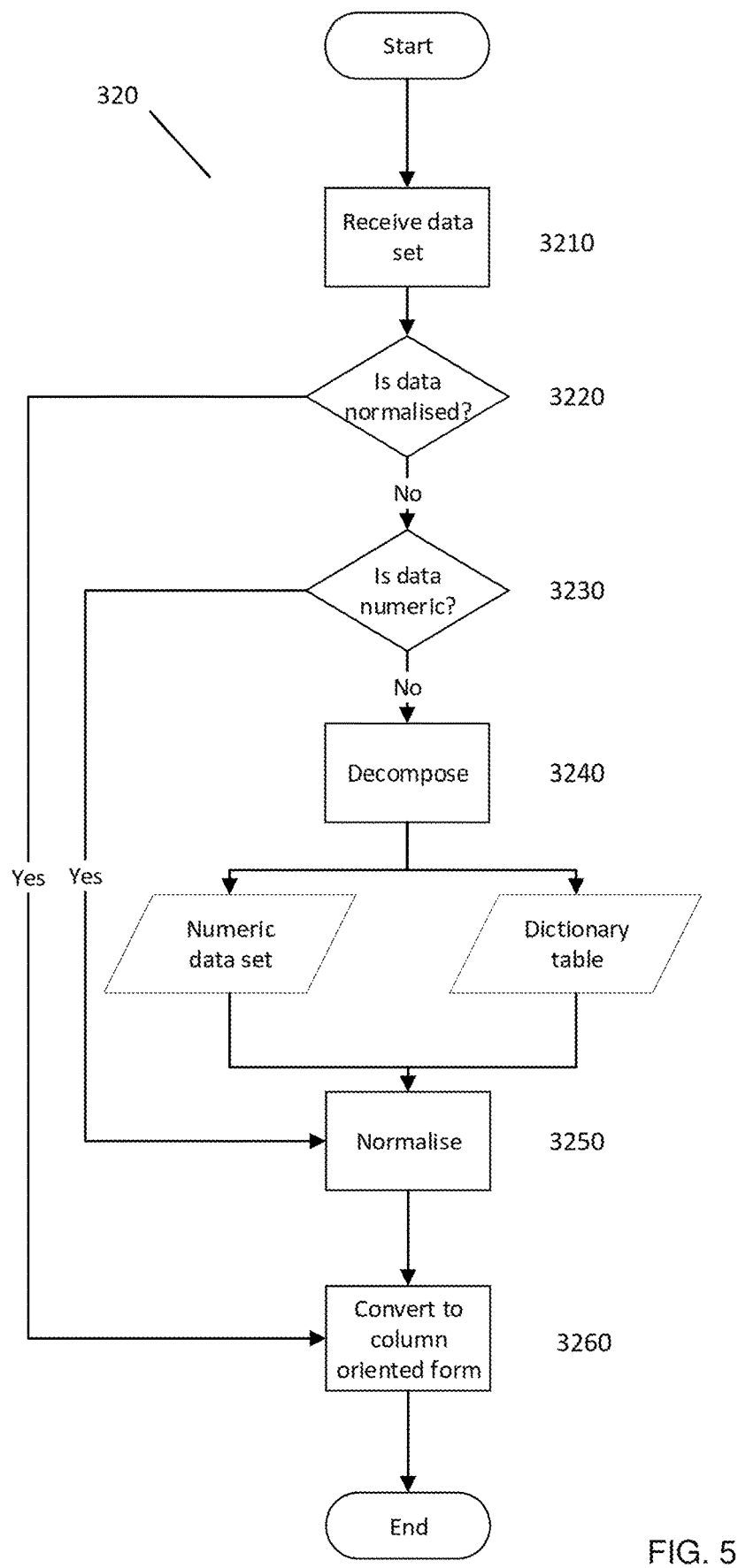
FIG. 5 shows a method according to an embodiment of the invention.

FIG. 5 illustrates a method according to an embodiment of the invention. The method may be performed as part of step 320 in some embodiments of the invention.

In some embodiments, the data received in step 310 will not be a series of numeric values. FIG. 5 illustrates further operations performed on the data received in order to form the one or more tensors. For example, the data received in step 3210 may be a portion of a relational data set. The relational data set may contain a mixture of numeric, string and date datatypes, although the possible datatypes are not limited in this respect.

An example relational data set according to an embodiment of the invention is shown below.

| Date | Name | Value |
|---|---|---|
| 15 Mar. 2018 | ABC | 432 |
| 15 Mar. 2018 | DEF | 658 |
| 15 Mar. 2018 | GHI | 5 |
| 16 Mar. 2018 | DEF | 7654 |

Step 3240 comprises a step of converting non-numeric entries in the relational data set to numeric entries. In the case where there are date entries, this may comprise converting the date entries into number of seconds since 1970 epoch, although any other numeric unit could alternately be used. If the relational data set contains string values, the string values are converted to corresponding numeric values and a conversion relationship between the string values and numeric values may be stored in a dictionary table. The relational data set has consequently been decomposed into a numeric data set and a dictionary table. In a case where the relational data set already comprises numeric values, step 3240 may comprise performing an analogous operation of converting the numeric value to a corresponding converted numeric value, and a conversion relationship between the numeric values and converted numeric values may be stored in a dictionary table. Step 3240 may advantageously improve pseudonymisation of the relational data set.

Step 3250 comprises applying one or more normalisation techniques to the data set. This may comprise applying linear algebra QR decomposition to the data set of columns, in order to determine dependencies between columns, although it is appreciated that other normalisation techniques can be used. Step 3250 may further comprise dividing the data set into a plurality of smaller data sets. When reference is made to performing subsequent operations on the relational data set, this will be understood to mean either the relational data set received in 3210 or a data set resulting from the division of the relational data set in step 3250. The dictionary table may also be treated as a data set.

Step 3260 comprises converting the relational data set to column oriented form. Each row of the relational data set is assigned a numeric identifier, which may be a unique numeric identifier (UNI). The UNI for each row of the data set may be stored in a new column of data. An example relational data set and dictionary table are illustrated below.

| UNI | Date | Name | Value |
|---|---|---|---|
| 100 | 1521072000 | 1 | 532 |
| 101 | 1521072000 | 2 | 658 |
| 102 | 1521072000 | 3 | 5 |
| 103 | 1521158400 | 2 | 7654 |

| Name | Corresponding String |
|---|---|
| 1 | ABC |
| 2 | DEF |
| 3 | GHI |

The relational data set may subsequently be separated into a set of columns, and for each column a set of distinct column values is compiled. For each distinct column value, UNIs are identified that have this column value as an attribute. A data structure is subsequently formed that represents the relationship of the distinct column values to an array of UNIs.

A data structure may be produced for each column in the relational data set. For example, the 'Date' column in the above relational data set yields the following data structure.

| Column Value | UNI Array |
|---|---|
| 1521072000 | [100, 101, 102] |
| 1521158400 | [103] |

Each row of the data structure can be expressed as a rank 1 tensor, i.e. a vector:

[1521072000 100 101 102]

Thus, embodiments of the method illustrated in FIG. 5 provide a tensor which may be provided to a method according to an embodiment of the invention such as illustrated in FIG. 3 for obfuscation.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer-implemented method of enhancing data privacy, comprising:
    determining, at a processor, one or more tensors of numeric data in dependence on input data;
    determining, at a processor, a transform in dependence on user-associated data;
    transforming, at a processor, each of the one or more tensors of numeric data into at least two fragments of data by applying the transform, wherein each of the at least two fragments of data obfuscates the numeric data; and
    storing, separately, each of the at least two fragments of data at a respective geographically separated storage system;
    wherein the transform is an invertible tensor transformation, and wherein the transforming comprises:
        dividing each tensor of numeric data into one or more parts;
        transforming each part of the tensor of numeric data into a transformed part in dependence on the transform; and
        determining the at least two fragments of data in dependence on each of the transformed parts.

2. The method of claim 1, comprising:
    retrieving the at least two fragments of data;
    determining a reverse transform in dependence on the user-associated data; and
    performing the reverse transform on the at least two fragments of data.

3. The method of claim 2, wherein the reverse transform provides the respective tensor corresponding to the at least two fragments of data.

4. The method of claim 1, wherein the user-associated data comprises data indicative of an input received from a user via a user interface.

5. The method of claim 1, wherein the user-associated data comprises biometric data associated with a user.

6. The method of claim 5, wherein the biometric data is indicative of one or more of: a fingerprint of the user, a heart rhythm of the user, an iris scan of the user, a facial structure of a user and DNA derived from the user.

7. The method of claim 1, wherein the determining one or more tensors of numeric data comprises encrypting the input data or data based on the input data.

8. The method of claim 1, comprising balancing at least some of the one or more tensors of numeric data prior to performing the transforming.

9. The method of claim 1, wherein the invertible tensor transformation is representable as an N×N tensor, wherein N is at least 2.

10. The method of claim 1, wherein the transforming each part of the tensor of numeric data comprises multiplying each part of the tensor of numeric data by the transform.

11. The method of claim 1, wherein each transformed part comprises at least a first value and a second value, and wherein:
    a first fragment of the at least two fragments of data is determined in dependence on the first value of each of the transformed parts; and
    a second fragment of the at least two fragments of data is determined in dependence on the second value of each of the transformed parts.

12. The method of claim 1, comprising:
    retrieving the at least two fragments of data;
    reconstructing the transformed parts in dependence on the at least two fragments of data; and
    performing a reverse transform on each of the transformed parts in dependence on reverse transform data.

13. The method of claim 1, where the storing, separately, each of the at least two fragments at a respective geographically separated storage system comprises:

storing, at a first computer system in a first geographic location, a first fragment of data corresponding to a first tensor of numeric data; and storing, at a second computer system in a second geographic location, a second fragment of data corresponding to the first tensor of numeric data.

14. The method of claim 1, wherein the input data is in a table format and the determining one or more tensors of numeric data comprises factoring out one or more tables of data and a dictionary.

15. The method of claim 14, wherein each of the one or more tensors of numeric data corresponds to a portion of one or more of the one or more tables of data and the dictionary.

16. A computing system, comprising:
one or more processors for operatively executing computer readable instructions; and
a computer-readable data storage medium accessible to the one or more processors storing computer-readable instructions which, when executed by the one or more processors, perform a method comprising steps of:
determining one or more tensors of numeric data in dependence on input data;
determining a transform in dependence on user-associated data;
transforming each of the one or more tensors of numeric data into at least two fragments of data by applying the transform, wherein each of the at least two fragments of data obfuscates the numeric data; and
storing, separately, each of the at least two fragments of data at a respective geographically separated storage system;
wherein the transform is an invertible tensor transformation, and wherein the transforming comprises:
dividing each tensor of numeric data into one or more parts;
transforming each part of the tensor of numeric data into a transformed part in dependence on the transform; and
determining the at least two fragments of data in dependence on each of the transformed parts.

17. The computing system of claim 16, comprising a communication module for receiving the input data from a client computing apparatus.

18. A non-transitory computer-readable data storage medium storing computer-readable instructions which, when executed by one or more processors, perform a method comprising steps of:
determining one or more tensors of numeric data in dependence on input data;
determining a transform in dependence on user-associated data;
transforming each of the one or more tensors of numeric data into at least two fragments of data by applying the transform, wherein each of the at least two fragments of data obfuscates the numeric data; and
storing, separately, each of the at least two fragments of data at a respective geographically separated storage system;
wherein the transform is an invertible tensor transformation, and wherein the transforming comprises:
dividing each tensor of numeric data into one or more parts;
transforming each part of the tensor of numeric data into a transformed part in dependence on the transform; and
determining the at least two fragments of data in dependence on each of the transformed parts.

* * * * *